March 26, 1935.  G. L. ERICKSON ET AL  1,996,042

MEASUREMENT OF TELEGRAPH INTERFERENCE

Filed June 21, 1932

INVENTOR
G. L. ERICKSON
J. H. HACKENBERG

*Eugene C. Brown*
ATTORNEY

Patented Mar. 26, 1935

1,996,042

UNITED STATES PATENT OFFICE 1,996,042

MEASUREMENT OF TELEGRAPH INTERFERENCE

George L. Erickson, Hasbrouck Heights, N. J., and John H. Hackenberg, Jackson Heights, N. Y., assignors to The Western Union Telegraph Company, New York, N. Y., a corporation of New York Application June 21, 1932, Serial No. 618,567

13 Claims. (Cl. 178—69)

This invention relates to a method of and means for measuring interference on telegraph and other communication circuits.

Interference on telegraph lines is usually in the nature of irregular peaks from a large number of sources. These peaks may occur in such order as to produce a fairly regular alternating current or they may consist only of occasional severe peaks.

This interference detrimentally affects the reception of telegraph signals, the effect in general being proportional to the amplitude of the interference.

In a copending application of Erickson and Christoffel, Serial No. 615,020, filed June 2, 1932, and entitled Testing the susceptibility of telegraph lines to interference, there is disclosed a method of determining to what extent a particular telegraph circuit will be affected by interfering currents of various amplitudes. The present invention is concerned with the determination of the actual interference occurring on a telegraph circuit, whereby from the measured susceptibility of the circuit to interference, the general transmission quality of the circuit can be determined.

The maximum levels of interference suffered on a particular line is generally determined by what is known as a "break over" test. This test, briefly, consists in applying a biasing current to a winding arranged in opposition to the main winding of a relay responsive to the interference current, while the opposite ends of the line are grounded and increased this biasing current slowly to a value where the relay is barely unaffected by interference peaks. The value of the interference peak can then be read in milliamperes on a meter in the biasing circuit.

It is one of the objects of the present invention to produce an improved method of making the so-called "break over" test which will give a continuous record of the nature and magnitude of the interference current.

One method of continuous measurement heretofore proposed is to employ a series of stepping magnets and ratchets which increase the relay biasing current by predetermined steps until the disturbances are overcome, that is, until the tongue of the relay is maintained constantly on its open or spacing side. A clock circuit is used to reduce the holding current from its maximum value at a slow rate. A continuous record of the level of the interference is then procured by means of a recording meter.

Aside from being expensive and complex the chief disadvantages of such a system are first, that the increase in the biasing circuit is in uniform steps irrespective of the magnitude or duration of the individual interference surges, and secondly due to the inertia of the stepping magnets, the response is not sufficiently rapid to record rapidly recurring interference peaks.

It is a further object of the present invention, therefore, to produce a "break over" recorder which is free from the mechanical stepping mechanism and other moving parts aside from the recording instrument itself and standard high speed telegraph relays.

A further object is to produce a recording system which is simple, reliable, sensitive and fast in operation.

Still another object is to cause the current in the biasing winding to build up in proportion to the magnitude of the individual interference peaks whereby a more accurate record of the contour of the interfering current will be obtained. This is particularly advantageous in analyzing the interfering current to determine its origin.

Other objects and advantages of the invention will hereinafter appear.

In accordance with one embodiment of the present invention the measuring apparatus may comprise the usual main line relay of a duplex terminal set connected in the line in its normal position, both terminals being connected to set ground. The relay has a biasing winding through which a local current is passed to overcome the effect of the interfering current. This winding is connected in the plate circuit of an amplifying tube, the grid of which is normally biased to such a potential that only a small plate current flows; when no interference current is being received the armature of the relay, normally rests on a grounded contact. The arrival of an interference current will then cause the relay armature to leave this contact, the circuit details being so arranged that upon such operation the potential of the grid is increased positively. The magnitude of this charge is dependent upon the length of time the interference current causes the relay armature to be away from the grounded contact. This grid biasing charge is allowed to accumulate on the plates of a condenser in the grid circuit and the condenser is provided with a shunt leakage path whereby it is subject to the opposed intermittent charging and the continuous discharging effects. Consequently the grid will assume a charge corresponding to the general level of the interference current, rising above this level to follow individually severe peaks and slowly returning thereto after such abnormal interference has subsided. A recording meter in the output circuit of the tube records the general nature and magnitude of the interference. By properly poling the direction of current through the biasing winding interference current of either polarity can be observed.

The invention will be more fully understood by reference to the accompanying drawing in which Figure 1 is a circuit diagram showing one embodiment of the invention;

Figure 1:
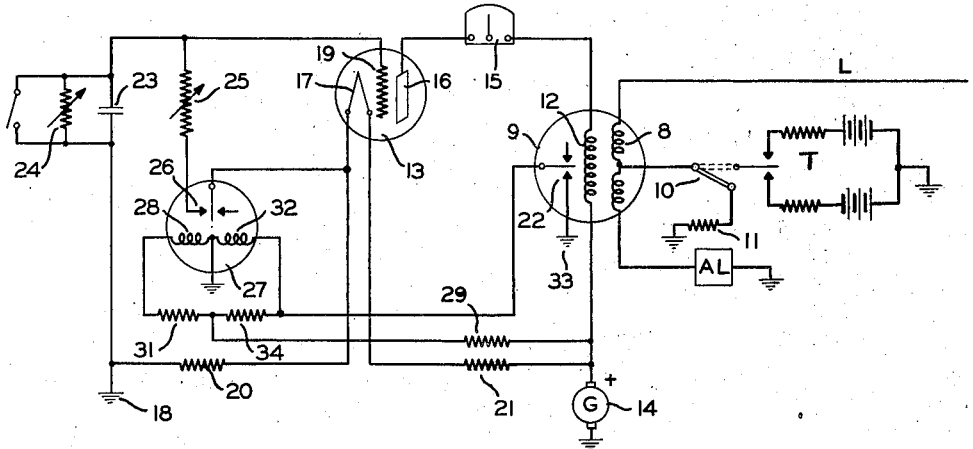

Referring first to Figure 1, we have shown a telegraph line L terminating in the main winding 8 of the main line relay 9 of a duplex terminal telegraph set. The opposite terminal of the winding 8 is connected to ground through the artificial line AL. A pole changer or other transmitting device T is connected to the midpoint of the differential winding 8, a switch 10 being provided to permit the set ground 11 to be substituted for the battery connection during testing. The relay also has a biasing winding 12 connected in the plate circuit of a three element vacuum tube 13, this circuit extending from the grounded generator 14 through the biasing winding 12 and a recording milliammeter 15, thence to the anode 16 of the tube 13, the circuit continuing from the cathode 17 to the ground at 18. The grid 19 of the tube is normally biased negative relative to the cathode by virtue of the voltage drop across a resistance 20 located in circuit between the cathode and ground. The magnitude of this bias is such that a very small plate current is allowed to flow, and the tongue of the relay 9 is maintained on its grounded contact 22 when no current is received over the line L. A condenser 23 in series with the grid 19 is provided with a shunt resistance 24 of high value thereby permitting any charge applied to the condenser to slowly leak off.

A resistance 25 is connected between the grid side of the condenser 23 and the cathode, through the tongue and right hand contact 26 of a second relay 27. By virtue of this connection each time the tongue of the relay 27 engages the contact 26 a positive current flows to the upper plate of the condenser 23 from cathode 17 through contact 26 and resistance 25. The condenser therefore becomes charged more positively, the magnitude of this charge depending upon the rate of current flow as determined by the value of resistance 25 and the period of engagement of the tongue of relay 27 with its contact 26.

The tongue of relay 27 is normally on its dead contact but is controlled from the main line relay in such manner that each time the tongue of the main line relay leaves its grounded contact 22 the relay 27 is forcibly operated to its contact 26. For this purpose the tongue of the relay 27 is normally biased to its dead contact by a winding 28 through a circuit extending from the generator 14, through resistances 29 and 31 and thence through winding 28 to ground. No current flows through the opposite winding 32, however, at this time since this winding is short circuited by the ground at contact 22 of the main line relay 11.

If an interference peak is now received on the main line winding 10 of sufficient magnitude to overcome the magnetic effect of the biasing winding 12 on the relay tongue, the tongue of the relay will leave its grounded contact 22 and travel toward its upper contact. The instant this occurs the ground 33 is removed from the winding 32 of relay 27, permitting current to flow from the generator 14 through resistance 34 and coil 32 to ground. Due to the adjustment of the values of resistances 31 and 34, this current is made several times greater than that in the winding 28 so that the tongue of the relay moves sharply over to its contact 26, completing the charging circuit for the condenser 23. This charging current continues to flow as long as the tongue of the main line relay 11 remains off its grounded contact and therefore the extent of the charge accumulated on the condenser is a measure of the duration of the interference peak.

The grid 19, of course, assumes the charge of the condenser and as it becomes more positive, permits a greater biasing current to flow through the tube 13 and winding 12. Consequently the current in the winding 12 quickly builds up to the general level of the interference current. Interference below this level will not affect the tongue of the main line relay but each peak rising above the level represented by the biasing current at any instant will cause the tongue of relay 11 to leave its contact 22 and so increase the charge on the condenser 23 and grid 19 and thereby increase the output current of the tube 13.

The charge on the condenser 23 is allowed to leak off slowly through the resistance 24 so that after each interference peak has been recorded by the milliammeter 15 the biasing current decreases until it again reaches a level below that of a succeeding impulse of interfering current. By regulating the rate of charging and discharging of the condenser 23, through manipulation of the resistances 25 and 24, the output circuit of the tube can be made to follow with fair accuracy the variations in amplitude of the received interference current.

Figure 2:
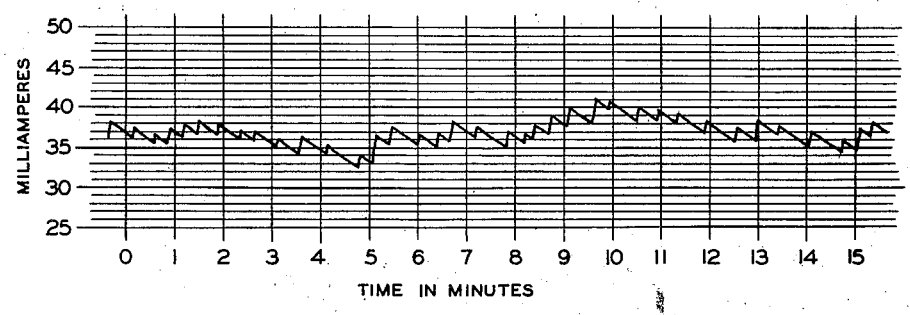
Figure 2 illustrates a typical record obtained in practicing the invention.

In Figure 2, we have shown a record obtained from the recording milliammeter 15 taken over a period of time on a telegraph line subject to average interference conditions. From this record it is possible to obtain the average level of the interference over any desired period of time and also the maximum interference peaks occuring during this period. From an analysis of such records, with particular attention to the frequency of occurrence of the maximum and minimum interference conditions, the period of the day at which they occur and similar observations, interferences can be drawn as to the chief causes of such interference and appropriate steps taken to relieve such condition or compensate therefor.

The general transmission quality of the line can be obtained by applying the values of the maximum interfering currents obtained from such a record to the susceptibility curves for the particular line under consideration, obtained in the manner set forth in the aforesaid application of Erickson and Christoffel.

It should be noted that the circuit arrangement shown in Figure 1 is extremely sensitive to the interfering currents, responding even to those of extremely short duration, since it is only necessary that the tongue of the relay 11 be deflected slightly from its grounded contact in order to produce a substantial operating current through the local relay 27. Each flicker of the tongue of the main line relay, therefore, produces an increase in the biasing current, this increase being in proportion to the magnitude or duration of the interfering current surges since the biasing current continues to rise at a substantially uniform rate as long as the surge of interference continues to flow, that is, as long as the tongue of the main line relay is held off of its grounded contact. By adjustment of the high resistance leak 24, the meter can be made to follow very closely the magnitude of the interference peaks so that the trace of a recording meter provides a substantially accurate envelope of the interfering current.

Figure 3:
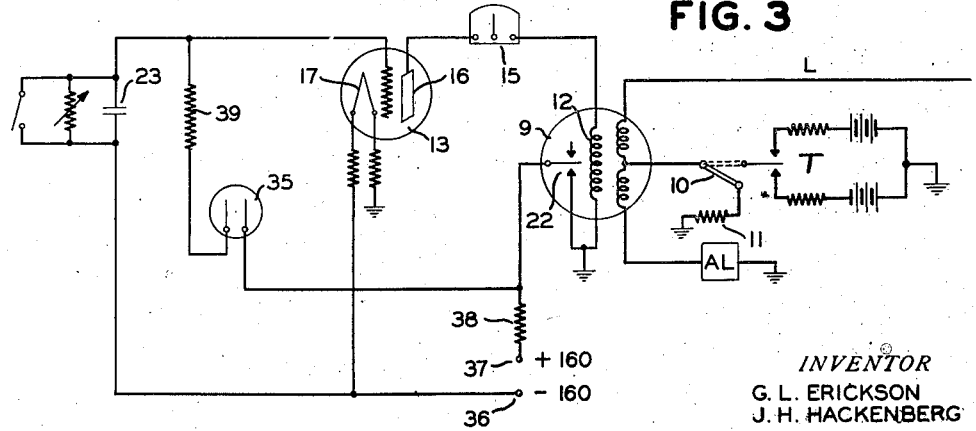
Figure 3 is a circuit diagram showing a modified embodiment of the invention.

In Figure 3 we have shown an arrangement in which the increase in the biasing current occurs substantially simultaneously with the arrival of the interfering peaks. In this form the relay 27 has been replaced by a gaseous discharge tube 35 such as a cold cathode neon lamp. This tube interposes a substantially infinite resistance in the charging circuit when the tongue of the relay 11 is on its grounded contact, so that normally no charging current flows. The output circuit of the vaccum tube 13 is completed from the negative source of potential 36 through the cathode 17, anode 16, recording meter 15 and biasing winding 12 to the ground. The charging current for the condenser 23 flows from the positive terminal 37 through a resistance 38, neon tube 35 and resistance 39 to the grid side of the condenser. The opposite plate of the condenser is connected to the negative source of potential 36.

With no interference current flowing the tongue of the relay 11 rests on its contact 22, thereby connecting one plate of the neon tube 35 to ground. As soon as the tongue of relay 11 leaves its grounded contact, however, substantially the full positive and negative potential of the sources 37 and 36 is applied across the electrodes of the neon tube, creating a discharge therethrough. The potential applied to the tube is adjusted by means of the resistances 38 and 39 to enable the discharge to be started while limiting the current flow to a low value. The flow of current through the tube is also determined by the size and spacing of the electrodes in the tube.

The neon tube is substantially inertialess, breaking down immediately as the tongue of the relay leaves its grounded contact and creating an immediate response in the output circuit of the vacuum tube 13. The discharge through the neon tube continues only as long as the tongue of the relay remains off its grounded contact. It is evident, therefore, that the increase in the biasing current in the winding 12 starts substantially concurrently with the arrival of the interference peak and continues to increase as long as the interference current is sufficient to maintain the tongue of the relay away from its grounded contact, that is, either until the current in the biasing coil has built up to that in the main line coil or until the latter current has subsided to the level of that in the biasing coil.

While the invention has been described in detail with respect to particular circuit dispositions and methods of securing operating potentials which have proven particularly satisfactory, it will be understood that various changes and modifications may be made therein without departing from the spirit and essential attributes of the invention, and it is intended therefore that the appended claims shall cover all such changes and modifications.

What we claim is:

1. A break-over recorder for determining the magnitude of interference current peaks on a communication circuit comprising a relay having a line winding and a biasing winding, means responsive to operation of said relay for increasing the current in the biasing winding whenever the magnetic effect of the current in the line winding due to a surge of interference current exceeds that of the current in the biasing winding, and means for rendering said increase in current in the bias winding proportional to the duration of the surge, and means for recording the current in the biasing winding.

2. A break-over recorder for determining the magnitude of interference current in a communication circuit comprising a receiving relay having a line winding and a biasing winding, a vacuum tube having an input and an output circuit said biasing winding being included in said output circuit and means in said input circuit controlled by said relay for varying the current in said output circuit.

3. A break-over recorder for determining the magnitude of interference current in a communication circuit comprising a receiving relay having a line winding and a biasing winding, a vacuum tube having said biasing winding in its output circuit, means for normally biasing the grid of said tube negatively, and means controlled by a preponderance of current in the line winding of said relay for rendering said grid more positive.

4. A break-over recorder for determining interference current in a communication circuit comprising a receiving relay having a line winding and a biasing winding, a vacuum tube having said biasing winding in its output circuit, a condenser in the input circuit of said tube, and means actuated when the current in the line winding predominates over the biasing effect of the current in the biasing winding for applying a positive charge to said condenser.

5. A break-over recorder for determining interference current in a communication circuit comprising a receiving relay having a line winding and a biasing winding, a vacuum tube having said biasing winding in its output circuit, a condenser in the input circuit of said tube, and means actuated when the current in the line winding predominates over the biasing effect of the current in the biasing winding for applying a positive charge to said condenser, and means for regulating the charging rate of said condenser so that the magnitude of said charge will be proportional to the period of said predomination.

6. A break-over recorder for determining interference current in a communication circuit comprising a receiving relay having a line winding and a biasing winding, a vacuum tube having said biasing winding in its output circuit, a condenser in the input circuit of said tube, means actuated when the current in the line winding predominates over the biasing effect of the current in the biasing winding for applying a positive charge to said condenser, and means for continuously discharging said condenser at a substantially uniform rate.

7. A break-over recorder for determining interference current in a communication circuit comprising a receiving relay having a line winding tending to move the relay tongue to one of its contacts in response to interference current of a definite polarity, a biasing winding tending to hold the tongue on its other contact, a vacuum tube amplifier having said biasing winding in its output circuit, a condenser in the input circuit of said tube, means for normally applying a negative charge to said condenser whereby to retard the current flow in said output circuit, and means operable whenever the tongue of the relay leaves its latter contact for rendering said condenser more positive whereby to increase the current in said output circuit.

8. A break-over recorder for determining interference current in a communication circuit comprising a receiving relay having a line winding tending to move the relay tongue to one of its contacts in response to interference current of a definite polarity, a biasing winding tending to hold the tongue on its other contact, a vacuum tube amplifier having said biasing winding in its output circuit, means in the input circuit of said tube for normally retarding current flow in said output circuit, and means operable whenever the tongue of the relay leaves its latter contact for decreasing said retarding effect whereby to increase the current in said output circuit.

9. A break-over recorder for determining interference current in a communication circuit comprising a receiving relay having a line winding tending to move the relay tongue to one of its contacts in response to interference current of a definite polarity, a biasing winding tending to hold the tongue on its other contact, means operable whenever said tongue leaves said latter contact for increasing the current in said biasing winding, storage means for maintaining said increase in current in the biasing winding when said tongue returns to said latter contact and other means tending to continuously decrease the current in said biasing winding.

10. A break-over recorder for determining interference current in a communication circuit comprising a receiving relay having a line winding tending to move the relay tongue to one of its contacts in response to interference current of a definite polarity, a biasing winding tending to hold the tongue on its other contact, a vacuum tube amplifier having said biasing winding in its output circuit, a condenser in the input circuit of said tube, means for normally applying a negative charge to said condenser whereby to retard the current flow in said output circuit, means operable whenever the tongue of the relay leaves its latter contact for rendering said condenser more positive whereby to increase the current in said output circuit and a high resistance leakage path in shunt to said condenser.

11. A break-over recorder for determining interference current in a communication circuit comprising a receiving relay having a normally closed contact, a biasing winding tending to hold the tongue of the relay on its closed contact, a line winding subject to interference current in said circuit, and opposing said biasing winding, a vacuum tube amplifier having said biasing winding in its output circuit, an input circuit for said amplifier a second relay having a biasing and an operating winding, circuit connections including said closed contact for rendering said operating winding ineffective, said winding being energized whenever the tongue of the line relay is off its closed contact, and means including the contacts of said second relay for increasing the biasing current in said receiving relay when said operating winding is energized.

12. Apparatus for indicating the maximum values of an irregular current comprising a device normally responsive to such maximum values, a space discharge tube responsive to the operation of said device for making the device momentarily sensitive only to increasingly larger current values, and an additional device for indicating the current sensitivity.

13. A system for determining the magnitude of electrical variations in a circuit comprising a relay responsive to said variations, a discharge tube having an output circuit, means controlled by said relay for increasing the current in said output circuit proportionally to the period of operation of said relay, means tending to decrease the current in said output circuit at a substantial uniform rate, means for utilizing the current in said output circuit to counteract the effect of said electrical variations on said relay and means for measuring said output current.

GEORGE L. ERICKSON.
JOHN H. HACKENBERG.